UNITED STATES PATENT OFFICE.

MILTON C. WHITAKER AND FLOYD J. METZGER, OF NEW YORK, N. Y.

COFFEE EXTRACT.

1,123,828.  Specification of Letters Patent.  Patented Jan. 5, 1915.

No Drawing.  Application filed July 19, 1912. Serial No. 710,486.

*To all whom it may concern:*

Be it known that we, MILTON C. WHITAKER and FLOYD J. METZGER, citizens of the United States, residing at New York city, county and State of New York, (post-office address, Broadway and One Hundred and Sixteenth street, New York city, New York,) have invented a new and useful Improvement in Coffee Extract, of which the following is a specification.

This invention relates to the production of a water soluble coffee extract; and more particularly to the production of a water soluble extract in the form of cakes or tablets which contains the essential oils or aroma and also the water soluble principles of the coffee. The novel product accordingly is a water soluble extract possessing the aroma, taste and other properties, and containing the constituents of roasted coffee in a concentrated and convenient form for use.

In producing the novel extract of the present invention roasted coffee berries are ground and the aromatic volatile constituents are removed by distillation with superheated steam. Thereafter the remaining water soluble constituents are extracted with water and the various extracts concentrated and recombined to give the final product.

The invention is further illustrated by the following and more detailed description.

Roasted and ground coffee is placed in a vessel and maintained at a temperature above 100° C. while steam is passed through it some time, generally for about one hour. By the use of dry steam in this manner the volatile constituents of the coffee containing the aroma are removed without moistening the ground coffee and thereby dissolving tannin, etc. The steam containing the aroma is condensed and contains the essential oils in solution. These oils can be extracted from the resulting water solution by a suitable solvent, such as ether, chloroform, etc., and by slow evaporation of these solvents the oils are obtained, or the ether solution can be added to the extract hereinafter referred to, and the ether evaporated, leaving the aroma or oils in the extract. The oils obtained in this way contain the aroma or aromatic volatile constituents of the coffee, but only those constituents which are volatilized as described above. This distillation with dry or superheated steam removes the volatile constituents of the coffee containing the aroma, leaving the coffee substantially dry. The coffee still contains all the original constituents excepting, of course, those removed by the steam treatment. As distinguished from extractive processes in which organic solvents are used, the present steam distillation does not remove non-volatile oils; nor are tannins and bitter substances present in coffee loosened up and modified as would be the case if the coffee were soaked or boiled with water. The coffee which has been subjected to the steam treatment is now extracted with hot water to remove the remaining water-soluble constituents and since the extract thus obtained is free from the volatile ingredients which have previously been removed, it does not require any precautionary measures to prevent removal of volatile constitutents. This aqueous extract or infusion is separated from the water insoluble ingredients of the coffee grounds by filtering or otherwise, and is evaporated to dryness, preferably in a vacuum. The evaporated extract is ground to a powder and the essential oils obtained by the steam distillation process are added to it. As already indicated, these may be added as such, or in the form of an ether solution, from which, after addition, the ether is removed.

There is thus obtained a water soluble coffee extract containing both the water soluble ingredients of the roasted coffee and the volatile aroma which gives to coffee much of its characteristic quality. The method of steam distillation for the removal of the volatile constituents leaves the coffee free from those volatile constituents, which can be volatilized. The subsequent extraction is applied to coffee free from volatile constituents, but which, as indicated above, has not been subjected to destructive or harmful extractive or modificative processes. Accordingly this aqueous extract to give a dry water soluble extract containing all of the natural and desired ingredients of the roasted coffee can be evaporated without danger of losing valuable volatile ingredients. After reincorporating the previously obtained aroma or volatile constituents to the dried extract, the extract becomes a water soluble coffee extract containing the desired and volatile constituents of the roasted coffee in a particularly advantageous combination and obtained in a natural and novel manner. Accordingly this extract forms a valuable substitute for coffee prepared directly from the roasted coffee beans. It has the added advantage, however, that it requires merely the addition of hot water to produce the coffee beverage.

The dried product with which the aroma or essential oils have been recombined can be pressed into tablets or cakes and in such form could be used, as already indicated, merely with the addition of hot water for the preparation of coffee possessing the properties and tastes of coffee made from roasted and ground coffee berries.

Having now described our invention and in what manner the same is to be performed, what we claim as new and desire to secure by Letters Patent is:

1. The process of producing a water soluble coffee extract which comprises removing volatile constituents from roasted coffee by dry steam distillation, separating such constituents from the products of distillation, extracting the resulting coffee with water, evaporating the aqueous extract thus obtained and incorporating therewith the volatile constituents.

2. The process of producing a water soluble coffee extract which comprises removing the volatile constituents from roasted coffee by dry steam distillation, separating such constituents from the products of distillation by extraction with an organic solvent, extracting the resulting coffee with water, evaporating the aqueous extract thus obtained and incorporation therewith the volatile constituents.

3. The process of producing a water soluble coffee extract which comprises removing volatile constituents from roasted coffee by dry steam distillation, separating such constituents from the products of distillation by extraction with an organic solvent, extracting the resultant coffee with water, evaporating the aqueous extract thus obtained, incorporating therewith the solution of the volatile constituents in the organic solvent and evaporating the solvent.

4. The process of producing a water soluble coffee extract which comprises removing volatile constituents from roasted coffee by dry steam distillation, separating such constituents from the products of distillation by extraction with ether, extracting the resulting coffee with water, evaporating the aqueous extract thus obtained and incorporating therewith the volatile constituents.

5. The process of producing a water soluble coffee extract which comprises removing volatile constituents from roasted coffee by dry steam distillation, separating such constituents from the products of distillation by extraction with ether, extracting the resulting coffee with water, evaporating the aqueous extract thus obtained, incorporating therewith the solution of the volatile constituents in the ether, and evaporating the ether.

6. The process of producing a water soluble coffee extract which comprises removing volatile constituents from roasted coffee by extraction with dry steam for about one hour, separating such constituents from the products of the distillation by extraction with an organic solvent, extracting the resulting coffee with hot water, evaporating to dryness the aqueous extract thus obtained, partially evaporating the solution of the volatile constituents, incorporating the partially evaporated solution with the dry aqueous extract, and completing the evaporation of the organic solvent.

7. The process of producing a water soluble coffee extract which comprises removing volatile constituents from roasted coffee by extraction with dry steam for about one hour, separating such constituents from the products of the distillation by extraction with ether, extracting the resulting coffee with hot water, evaporating to dryness the aqueous extract thus obtained, partially evaporating the solution of the volatile constituents, incorporating the partially evaporated solution with the dry aqueous extract, and completing the evaporation of the ether.

8. In the production of a coffee extract the step which comprises extracting roasted coffee with dry steam to remove the volatile aromatic constituents.

9. A water soluble extract of roasted coffee comprising the volatile constituents of roasted coffee which are volatile with dry steam, and the non-volatile constituents which are water-soluble, in a dry solid form, substantially as described.

10. A water soluble extract of roasted coffee comprising the volatile constituents of roasted coffee which are volatile with dry steam, and the non-volatile constituents which are water-soluble, in the form of a portable ration which on dissolving in water will produce a cup of coffee.

11. A water soluble extract of roasted coffee comprising the volatile constituents of roasted coffee which are volatile with dry steam, and the non-volatile constituents which are water-soluble, in the form of a dry solid cubical ration which on dissolving in water will produce a cup of coffee.

12. A water soluble extract of roasted coffee comprising the extracted volatile constituents free from decomposition products and the water soluble non-volatile constituents.

13. A water soluble extract of roasted coffee comprising the volatile and water soluble non-volatile constituents free from decomposition products and in a dry solid form.

14. A solid water soluble extract of roasted coffee comprising the water soluble and the volatile constituents of roasted coffee.

In testimony whereof, we have hereunto set our hands in the presence of two subscribing witnesses.

MILTON C. WHITAKER.
FLOYD J. METZGER.

Witnesses:
FREDERIC W. ERB,
CHARLES F. CLAAR.